Feb. 25, 1936.  G. L. DIMMICK  2,031,822
PHONOGRAPHIC APPARATUS
Filed June 1, 1933
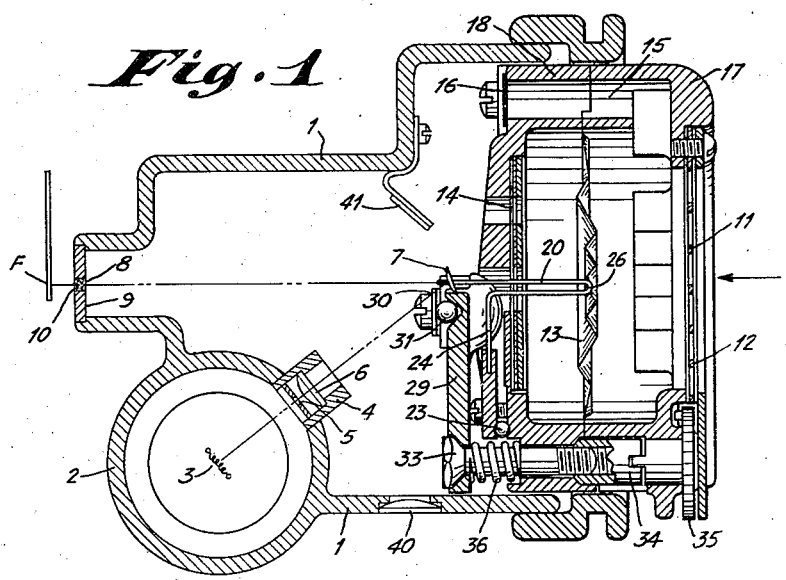
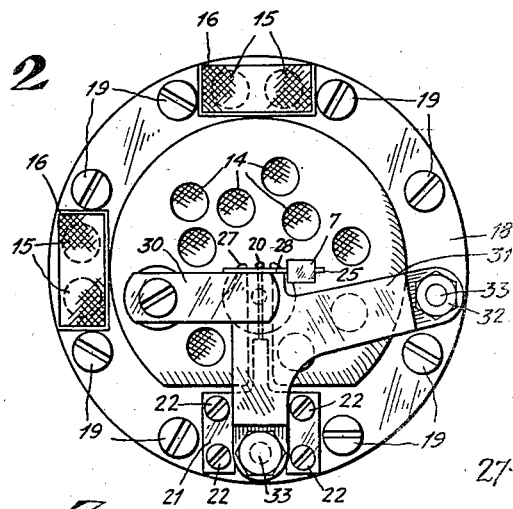
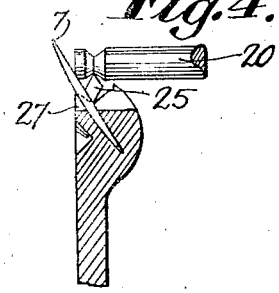
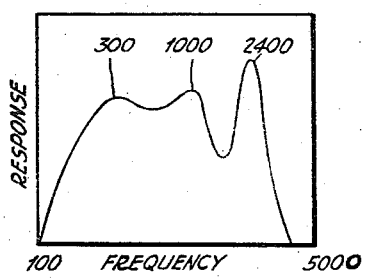
INVENTOR
GLENN L. DIMMICK
BY H. G. Grover
ATTORNEY Patented Feb. 25, 1936

2,031,822

UNITED STATES PATENT OFFICE 2,031,822

PHONOGRAPHIC APPARATUS

Glenn L. Dimmick, Westmont, N. J., assignor to Radio Corporation of America, a corporation of Delaware Application June 1, 1933, Serial No. 673,862

6 Claims. (Cl. 274—5)

This invention relates to phonographic apparatus and more particularly to the variety thereof wherein an acoustically operated diaphragm causes vibrations of a mirror and thereby causes movements of a beam of light upon a moving photographically sensitized surface.

The invention is particularly applicable to the form of such devices used in recording sound synchronously with pictures upon small size motion picture films.

The present invention involves a specific type of diaphragm and optical system arrangement which is adapted to be fitted bodily into a sound recording camera of the type of small camera used for direct recording of sound and pictures on 16 mm. film.

One object of the invention is to provide such a device which is extremely rugged and compact.

Another object of the invention is to provide such a device which is readily adjustable.

Another object of the invention is to provide such a device which is simple and readily manufactured to the requisite degree of accuracy.

Another object of the invention is to provide a novel and rugged means for connecting the diaphragm to the mirror.

Another object of the invention is to provide means for adjusting the position of the mirror from the exterior of the apparatus.

Another object of the invention is to provide such a device having satisfactory frequency characteristics.

Another object of the invention is to provide a device having a suitable wind screen.

Another object of the invention is to provide such a device for suitable damping of the diaphragm.

Referring now to the drawing:

Fig. 1 is a longitudinal sectional view of the device taken perpendicularly to the axis of longitudinal motion of the film.

Fig. 2 is a rear view of the portion of the device which contains the diaphragm.

Fig. 3 is a typical frequency characteristic curve.

Fig. 4 is an enlarged view showing the mirror mounting.

Referring first to Fig. 1: A body portion 1 is provided which is preferably a casting of aluminum alloy, a portion of the casting indicated at 2 forms a light-tight cylindrical housing for the exciter lamp 3. The inner wall of portion 2 is provided with a circular aperture into which is fitted the bushing 4 carrying a portion of the optical system. Within this bushing 4 is located a member having a rectangular aperture 5, and also a plano-convex lens 6. Light from the filament of the exciter lamp 3 illuminates the aperture 5 and from there is focussed by the lens 6 upon the vibratable mirror 7. This mirror has a flat silvered rear surface and a spherically convex front surface so that, in conjunction with the lens 6, an image of the aperture 5 is focussed upon the film F. In the portion of the casing adjacent the film is a screen 9 having an aperture 8 in which a cylindrical lens 10 of very short focal length is fixed. The lens 6 and the mirror 7 form an image of the aperture 5 upon the screen 9 in the form of a spot of light which reaches half-way across the lens 10 and extends an equal distance over the opaque portion of the screen when the mirror is in the zero position. Lens 10 focusses this spot down to a very fine line of light upon the film F, the one end of which line is defined by the image of the aperture 5 produced by the lens 6 and the mirror 7, and the other end of which line is defined by the aperture 8. It will be apparent that vibration of the mirror 7 about the axis perpendicular to the plane of the paper will cause movement of the line of light in the plane of the paper and back and forth across the aperture 8, thereby moving the linear image upon the film F in a direction transverse to its direction of movement.

The lens 10 is a short focus cylindrical lens and converges the beam of light longitudinally of the film, i. e., perpendicularly to the plane of the paper, into a very fine line which, as just described, is shifted in the direction of its own length and transversely of the film in response to sound vibrations.

To now describe the mirror actuating mechanism: Sound waves from any desired source are impressed upon the device in the direction indicated by the arrow to the right of Fig. 1. These sound waves pass through the protective grill 11 which is covered on each side by appropriate fabric 12 into the space in front of the diaphragm 13 and thereby cause actuation of the said diaphragm. The vibrations of the diaphragm tend to cause compression and rarefication of air to the rear of the diaphragm and such variations in pressure are relieved through screened apertures 14 constituting acoustically damped passageways as indicated in Figs. 1 and 2.

Equalization of pressure between the front and rear of the diaphragm and the elimination of undesirable low frequencies is accomplished by the air passages 15 which, as shown in Fig. 1, pass from the front to the rear of the diaphragm and, as shown in Figs. 1 and 2 are covered at the rear end by a piece of porous paper 16 which prevents the dissipation of higher frequencies through these channels. These passages thereby produce acoustically damped passageways for the passing of low frequency impulses.

The edge of the diaphragm is clamped rigidly between two body members 17 and 18 which are held firmly together by screws 19, and it is the rear body member 18 which serves to support the mirror and its adjusting mechanism.

The driving rod for the mirror is composed of a bent wire preferably of such material as duralumin. One end of this wire is fixed rigidly into the retaining member 21 which is held to the member 18 by the screws 22 and is pivoted at its midpoint upon the ball 23 which rests upon the member 18. It will be apparent that the member 21 can be locked in any direction in relation to the member 18 by tightening the screws upon one side and loosening the screws upon the other side thereof, thereby causing movement of the shank 24 of the member 20.

The member 20 has a narrow groove at its outer end which fits against the spindle 25 which carries the mirror 7, and the resilience of the member 20 maintains it firmly thereagainst.

The member 20 is secured firmly to the diaphragm at 26 by an appropriate cementicious material.

It will be apparent that adjustment of the shank 24 of the member 20 by means of the screws 22 will permit adjustment of the member 20 to a position perpendicular to the diaphragm and also permit adjustment of tension upon the diaphragm, but that it will not necessarily adjust the position of the mirror in relation to the remainder of the optical system, and such adjustment is secured as follows: The diamond-shaped spindle 25 rests in two V-grooves at 27 and 28 in the movable member 29 and the driving rod 20 contacts with the opposite edge of the spindle 25 between these grooves as shown in Fig. 2. The member 29 has a hemispherical face contacting with a corresponding recess in the member 18 and can be rocked in any direction about the center of this face. The spring 30 presses the ball 31 firmly into a notch in the top of the member 29 and thereby retains the member 29 firmly against the member 18, the member 29 as shown in Fig. 2 is provided with a laterally extending arm 31 for the purpose of adjustment of the axis of the mirror spindle 25 into parallelism with the plane of motion of the film, (i. e. truly perpendicular to the plane of the paper in Fig. 1). Such adjustment is accomplished by the nut 32 which is movable upon the screw 33. The arm 31 may be retained snugly against the nut 32 either by another nut underneath the arm or by a spiral compression spring, if desired, and it will be apparent that the axis of the mirror spindle 25 will be rotated about the center of the hemispherical portion of the member 29 for the adjustment just stated.

An adjustment which is more often necessary and which must therefore be more readily secured as well as requiring as great a degree of precision in much smaller dimensions is the adjustment of the mirror 7 about its axis of rotation. This adjustment is secured by the screw 33, the nut 34 co-operating therewith and the handwheel 35 which serves to actuate the nut.

As shown in Fig. 1, a spring 36 is provided which holds the member 29 firmly against the head of the screw 33 and also prevents any "lost motion" between the member 29 and the screw 33. As shown in Fig. 1 the screw 33 is longitudinally slidable in the member 18 and the nut 34 is held firmly against the member 18 by the action of the spring 36. Therefore, if the nut 34 is rotated, the screw 33 is moved in or out and the V-notches 27 and 28 are correspondingly moved nearer to or farther away from the member 18. Rotation of the nut 34 is secured by the wheel 35 which engages therewith.

Inspection of the adjustment of the optical system is secured through the lens 40 of Fig. 1 which is focussed upon the mirror 41 and thereby permits inspection of the light falling upon the screen 9.

The characteristic curve in Fig. 3 indicates approximately the relative frequency characteristics of the apparatus just described. It is shown by this curve that the bypass tubes 15 eliminate completely all frequencies below 100 cycles per second; the peak at 300 cycles is due primarily to the acoustic resonance of the air space within the casing 1, the peak at 1,000 cycles is due primarily to the resonance of the cavity back of the diaphragm 13 and in front of the rear portion of the body member 18, and the peak at 2400 cycles is due primarily to the mechanical characteristics of the device. The portions of the curve which are due to the causes referred to are readily identified experimentally by varying the structural feature controlling the effect referred to and noting the variation in the corresponding point upon the curve.

I claim:

1. Sound recording apparatus including a diaphragm, means arranged to form chambers on opposite sides of said diaphragm, an additional compartment adjacent one of said chambers, and acoustically damped passageways extending between said compartment and said chambers.

2. Sound recording apparatus including a diaphragm, means arranged to form chambers on opposite sides of said diaphragm, a compartment adjacent one of said chambers, and light responsive means mounted in said compartment and activated by said diaphragm.

3. Sound recording apparatus including a sound responsive member, means arranged to form chambers on opposite sides of said member, a compartment adjacent one of said chambers, and acoustically damped passageways of predetermined frequency characteristics extending between said compartment and said chambers.

4. Sound recording apparatus including a sound responsive member, means arranged to form chambers on opposite sides of said member, an acoustically resonant compartment adjacent one of said chambers, light responsive means mounted in said compartment and activated by said diaphragm, and acoustically damped passageways of predetermined frequency characteristics extending between said compartment and said chambers.

5. Mirror driving means for acoustic apparatus comprising a diaphragm, a bent driving rod connected to the said diaphragm at its bent portion and having a portion extending perpendicularly from the diaphragm toward the mirror and having a second portion bent at an angle and rigidly secured in an adjustable support.

6. An optical unit for photographic sound recording apparatus comprising a casing, an exciter lamp within said casing, an acoustic diaphragm in one end of said casing, a vibratable mirror, means operably connecting said diaphragm and said mirror, and an optical system within said casing focusing the beam of light acoustically modulated by said mirror upon a sensitive film exterior of said casing.

GLENN L. DIMMICK.